United States Patent [19]
Evans

[11] Patent Number: 5,158,033
[45] Date of Patent: Oct. 27, 1992

[54] AIR CUSHION VEHICLES

[76] Inventor: Carmi G. Evans, 950 Cascade Dr., Apt. 232, Woodburn, Oreg. 97071

[21] Appl. No.: 656,587

[22] Filed: Feb. 19, 1991

[51] Int. Cl.$^5$ .............................................. B60V 1/04
[52] U.S. Cl. ................................... 114/289; 114/290; 180/120; 180/126
[58] Field of Search ................... 114/288, 289, 290; 180/120, 126

[56] References Cited

U.S. PATENT DOCUMENTS

| | | | |
|---|---|---|---|
| 2,387,627 | 10/1945 | Warner | 180/120 |
| 2,559,036 | 7/1951 | Warner | 114/289 |
| 3,082,976 | 3/1963 | Dornier | 180/120 |
| 3,267,898 | 8/1966 | Evans | 114/67 |
| 3,424,120 | 1/1969 | Koriagin | 114/280 |
| 3,727,246 | 4/1973 | Wakowitz | 114/289 |
| 3,805,913 | 4/1974 | Jackes | 180/120 |
| 4,056,159 | 11/1977 | Evans | 180/120 |
| 4,977,845 | 12/1990 | Rurdquist | 114/289 |
| 4,993,349 | 2/1991 | Solari | 114/289 |

*Primary Examiner*—Sherman Basinger
*Assistant Examiner*—Thomas J. Braham
*Attorney, Agent, or Firm*—Eugene M. Eckelman

[57] ABSTRACT

An elongated vehicle body has a forward bow portion, a stern, and a lower portion with the floor and sides runners defining a longitudinal rearwardly opening air channel in the underside thereof. The bow portion has a duct with a driven impeller therein communicating with a plenum chamber in turn communicating with the air channel. Valves are provided at the outlet for directing air flow from the plenum chamber selectively downwardly, rearwardly and forwardly and also for developing a vacuum under a forward portion of the vehicle to pull down a bow wave that may develop under forward movement of the vehicle. The runners have lateral openings adjacent the rear portion of the vehicle and actuator controlled rudders are disposed at these openings for movement inwardly to steer the vehicle and outwardly beyond the outer side of the runners for establishing a reverse thrust of the vehicle. Steering controllers are provided at these lateral openings that have at least two passageways therethrough for selective engagement with angled valve seats at the rear opening. A pair of trim flaps at the rear are mounted on laterally extending pivots and support depending steerable rudders.

5 Claims, 3 Drawing Sheets

AIR CUSHION VEHICLES

BACKGROUND OF THE INVENTION

This invention relates to new and useful improvements in air cushion vehicles.

Air cushion vehicles have heretofore been known. One such vehicle is shown in my U.S. Pat. No. 4,056,159. The structure covered in such patent was designed to provide stabilization and directional control of the vehicle and thus eliminate complex propulsion and directional control means of prior vehicles.

SUMMARY OF THE INVENTION

According to the present invention, improvements have been made to the structure of that shown in my U.S. Pat. No. 4,056,159, with the result that greater propulsion and directional control, as well as improvements in stabilization, are present to provide an efficiently operating vehicle.

The primary object of the invention therefore is to provide a new and improved air cushion vehicle and particularly one that has improved propulsion, directional control, and lateral balance and stability.

In carrying out the objectives, the air cushion vehicle of the present invention is particularly adaptable as a marine vessel, although the concepts thereof may be applied to land vehicles as well. As a marine vessel, the vehicle has a hull or body with a longitudinal air channel in the underside bounded by rigid side walls. A duct is provided in a forward portion of the vehicle through which air is driven by an impeller that forces air into the channel to provide a supporting air cushion under the vehicle. The air channel is divided into a central channel and a pair of side channels by longitudinal curtains. Air from the side channels is directed to control vanes and side rudders which control steering or reverse thrust. Directional control rudders and trim flaps are provided at the rear.

In a first feature of the present invention, a valve assembly is provided in the forward duct portion that is capable of controlling air flow for forward, or reverse thrust, lateral stability, and also to reduce the bow wave and hold the boat down on the water. Side rudders are provided that contribute to efficient steering and stabilization.

Another feature of the present invention is the provision of an outwardly and downwardly angled wall surface along the inner surface of side runner portions that serve to efficiently utilize the upward lifting force of pressured air in the longitudinal channel.

The invention will be better understood and other objects and advantages will become apparent from the following description taken in connection with the accompanying drawings.

DETAILED DESCRIPTION OF A PREFERRED EMBODIMENT

Figure 1:
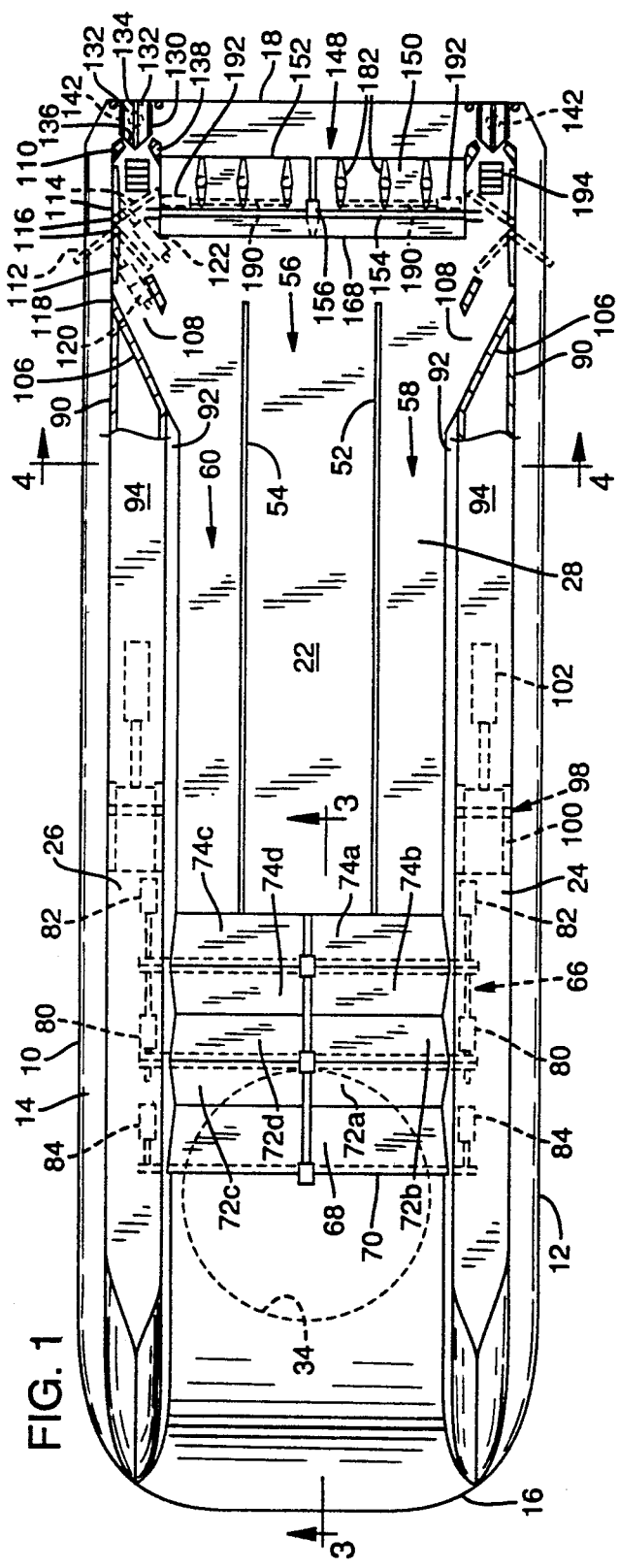
FIG. 1 is a bottom plan view of a marine vessel embodying features of the present invention, a portion of this view at the rear of the vehicle being broken away to show details of structure.

As herein noted, the vehicle may have various uses but its primary use is as a water vessel and it will be shown and described herein for such a use. It has a body or hull 10 with sides 12 and 14, a bow 16, a stern 18, and a cockpit area 20 with a floor 22 extending the full length of the vessel. Sides 12 and 14 have full length side hollow runner portions 24 and 26, respectively, that extend below floor 22 and form a longitudinal air channel 28 therebetween at the underside of the vessel. The air channel 28 is closed at the forward end by a transverse wall 30 and is open at the stern 18.

An upright duct 34 is provided in the bow portion of the vessel and has a top opening inlet 36. Mounted in this duct is an impeller 38 driven by a suitable motor or engine 40. The plenum chamber 42 below the duct has a defining front wall 44 and a rear wall 46, these walls curving downwardly and rearwardly at an angle of approximately 30 degrees and communicating with the air channel 28 at an outlet 48 rearwardly of transverse wall 30.

Two longitudinally extending curtains 52 and 54 depend integrally from the underside of floor 22 and divide the air channel 28 into a central air passageway 56 and side air passageways 58 and 60. The air flow from the peripheral portion of the impeller will be faster at portions of the impeller outwardly of the hub whereby the air flow through the side passageways 58 and 60 will be faster than through the center passageway 56. The curtains 52 and 54 extend from a point adjacent the outlet 48 to a position near the stern 18 and hang substantially vertical from the floor 22. These curtains are sufficiently rigid to define the various passageways but of some flexibility to flex if struck by foreign objects.

Figure 3:
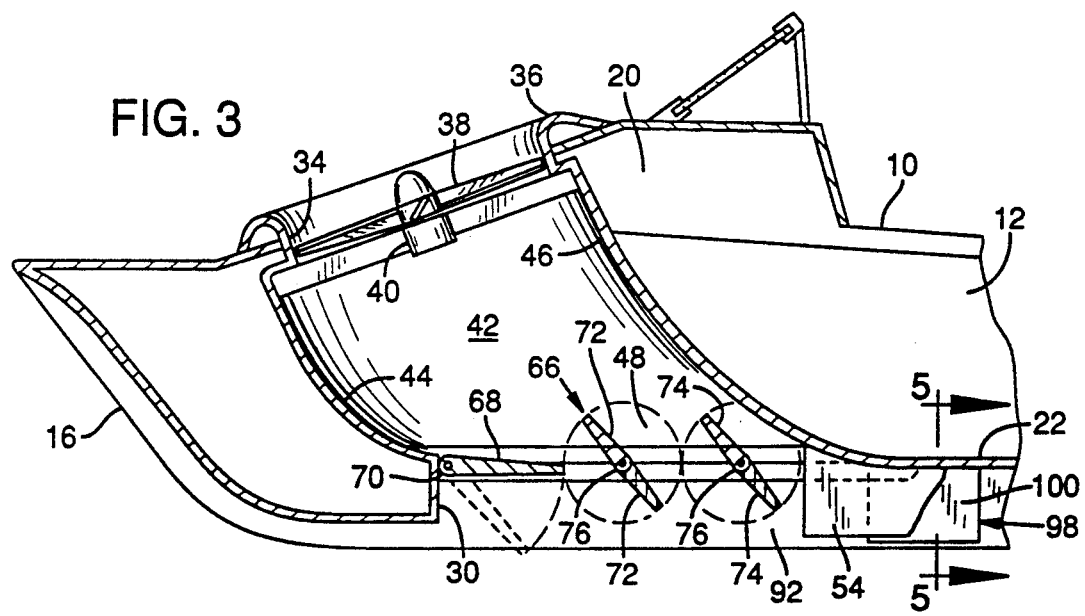
FIG. 3 is a vertical sectional view taken on the line 3—3 of FIG. 1 but showing the vehicle in upright position.
Figure 4:
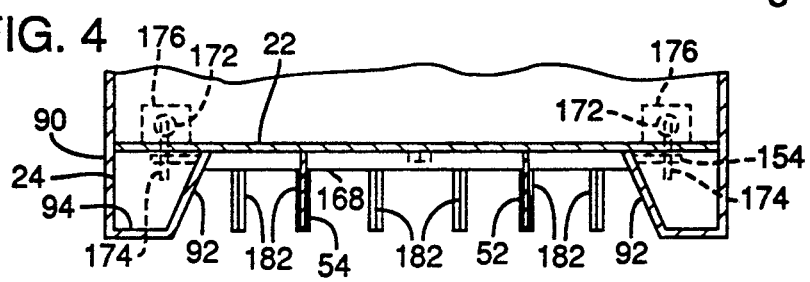
FIG. 4 is a cross sectional view taken on the line 4—4 of FIG. 1 and also showing the vehicle in upright position.

Mounted in the outlet 48 is a valve assembly 66 having a first paddle-type transverse flap 68 pivotally supported at the wall 30 by a pivot assembly 70 and a pair of valve units 72 and 74 that are of similar structure and mounted on parallel hinge rods 76 extending transversely across the outlet in a horizontal plane at the upper portion of the wall 30. The pivot assembly 70 for the flap 68 is along the front edge of the latter at the upper portion of wall 30 and this flap can swing from a horizontal position to controlled downwardly angled positions one of which is shown in broken lines in FIG. 3. Valve units 72 and 74 can adjust to any position in a half circle, as shown in phantom lines in this same figure. The flaps 68 and valve units 72 and 74 have a tip relationship that allows the downward flow of air in plenum chamber 42 to be controlled. Each valve unit has a front flap and a rear flap, the corresponding flaps of the four units being labeled a, b, c, and d for reference. In relation to the normal orientation of the vehicle, valve flaps 72a and 72b are at the right front of outlet 48, flaps 72c and 72d are at the left front, flaps 74a and 74b are at the right rear and flaps 74c and 74d are at the left rear. Front flaps 72a, 72c, 74a and 74c are all controlled individually by actuators 80, and rear flaps 72b, 72d, 74b, and 74d are likewise controlled individually by actuators 82. The front paddle type flaps 68 are controlled by actuators 84. The operation and function of the valve assembly 66 and the flaps 68 are detailed hereinafter.

Figure 5:
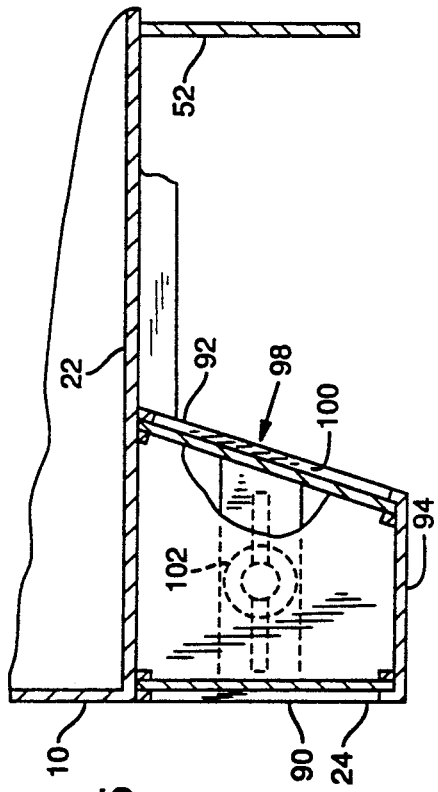
FIG. 5 is an enlarged fragmentary sectional view taken on the line 5—5 of FIG. 3.
Figure 2:
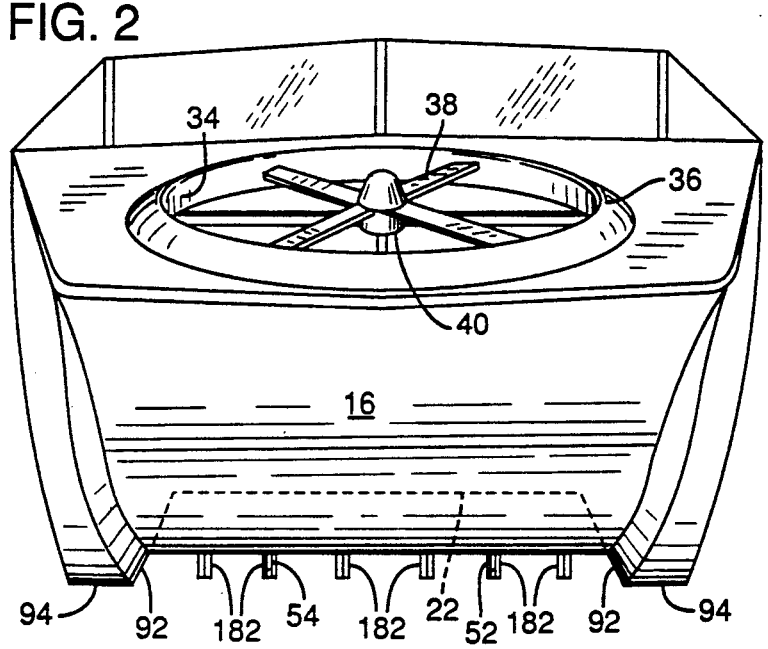
FIG. 2 is a front elevational view of the vessel.

Runners 24 and 26 are each defined longitudinally by an outer side wall 90, best seen in FIG. 5, by an inner side wall 92 and by a flat bottom wall 94. The top of these runners is closed by the floor 22 of the boat. Inner side walls 92 are tapered outwardly from top to bottom for a purpose to be described hereinafter.

Steering ports 98 are provided through the runners just rearward of the valve assembly 66. Slidable doors 100 are associated with these ports and have slidable opening and closing movement by an actuator 102 capable of moving the doors to control the flow of air and water to the exterior of the vehicle from side passageways 58 and 60, respectively. Ports 98 add to the steering capability of the vehicle, as will be more apparent hereinafter.

Each of the runners 24 and 26 has a rear laterally directed tunnel 106 with an inlet 108 in the inner wall 92 and an outlet 110 at the stern. Air from the side channels 58 and 60 can either pass through the respective tunnels 106 and out the outlet 110 or be deflected by diverter vanes 112 and 114 having back to back suspended pivot support from the bottom wall 22 of the vehicle and operating in opposite directions in a longitudinal outlet opening 118 in the outer wall 90 of the runners. Actuators 120 supported on the upper surface of the floor 22 are connected to pivot 116 for the vane 112 and are of a back to back structure which allows them to move the vanes to the full line position shown in FIG. 1 or either of the outwardly inwardly angled positions shown in dotted lines. Diverter vane 114 is operated by an actuator 122 also supported on the upper surface of the floor 22 and operatively connected to the vane 114 for moving it to either the angled broken line closed position in the outlet opening 118 or the full line open position shown in full lines. The broken line position of the vanes 114 comprises a position that closes off rearward flow of air and water through the stern outlets 110.

Figure 6:
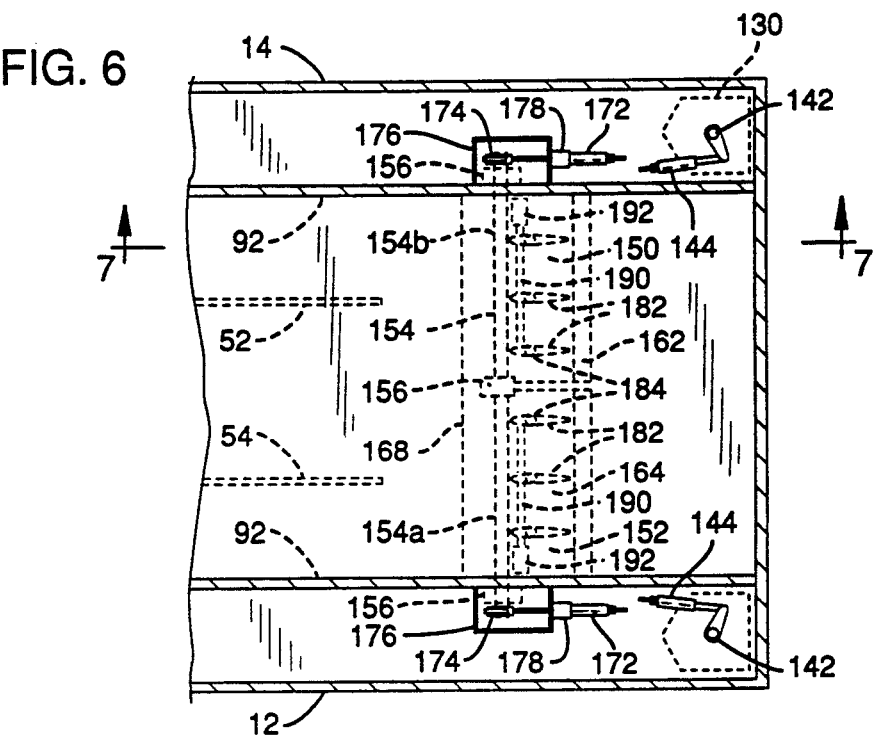
FIG. 6 is a fragmentary, horizontal sectional view looking down on the main rear rudder assembly, this view being taken on the line 6—6 of FIG. 7.

Further control of the flow of air and water through stern outlets 110 is accomplished by auxiliary rudders 130 having a pair of longitudinal passageways 132 therethrough divided centrally by a wall 134. Passageways 132 extend through the full length of these rudders and the front of such rudders has oppositely angled vertical surfaces 136 associated with respective correspondingly angled rear edges 138 of stern outlet 110. Rudders 130 have suspended support on pivots 142 associated with an actuator 144, FIG. 6, arranged to pivot the rudder a small amount in either direction from center. When these rudders are centered, air and water can flow straight through both passageways 132 but when turned against one of the angled surfaces 138, the passageway 132 at that angled edge will be shut off and air and water can flow only through the opposite passageway and any space that may exist between this opposite side of the rudder and the respective surface 138. Rudders 130 are capable of performing various steering functions, to be described hereinafter.

Figure 7:
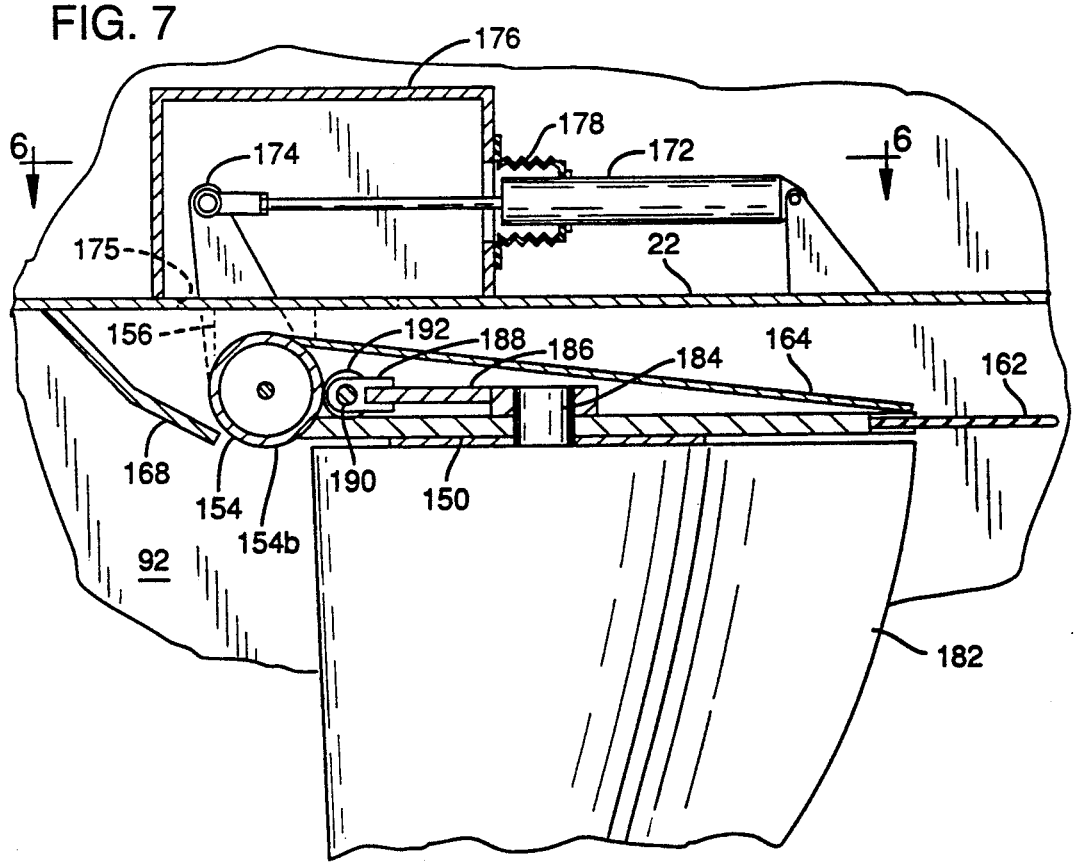
FIG. 7 is a cross sectional view taken on the line 7—7 of FIG. 6.

Mounted below the floor 22 immediately to the rear of inlets 108 is a central trim and rudder assembly 148. This assembly includes a pair of trim flaps 150 and 152, FIGS. 1, 5 and 6, supported on a cross shaft 154 at their forward edge having journaled suspended support 156 on the bottom surface of the vehicle floor 22. Shaft 154 is in two segments 154a and 154b and has bearing supports 156. Trim flaps 150 on their respective shaft segments are arranged to be pivoted between horizontal and lowered positions upon rotation of the shaft 154. FIG. 7 shows the horizontal position thereof in full lines. The tip or free ends of these flaps have a semiflexible extension 162 arranged to have some protective flexibility in the event that an object is struck while in a down position. Angled struts 164 are secured between the shaft 154 and an outer portion of the flap whereby a strong but lightweight structure is achieved. Airflow along the bottom of the vehicle is deflected below the shaft 154 and the trim flaps when horizontal by an angled baffle 168. Respective rotation of the shaft segments 154 is accomplished by side actuators 172 mounted on the upper surface of the boat floor and having piston rod connection to upright levers 174 and passing through slots 175 in the vehicle floor and integral with the shaft segments. Upward flow of water through the floor of the boat at this slot is contained within a fluid type housing 176, the actuator 172 in turn having a fluid tight seal 178 with the housing.

Each flap 150 and 152 supports two or more depending rudders 182 extending from a point adjacent the pivot 154 to a rear portion of the flaps 150 and 152. Each rudder has an upwardly projecting stub shaft 184 journaled in the flaps to which rearwardly extending levers 186 are secured. These levers in turn are driven in short horizontal movements by pivoted lever connections 188 on transversely driven cross rods 190. Cross rods 190 are driven transversely by actuators 192.

The floor 22 of the vehicle includes openings 194 just forward of the auxiliary rudders 130. These openings have baffles therein that are angled rearwardly and upwardly, whereby forced air from the passageway 56 picks up water and discharges it at the stern of the boat to provide an additional water and air propulsion thrust.

In operation, the lift, propulsion, steering and braking are all dependent on the airflow from impeller 38. The valve assembly 66 controls the proportion of lift to thrust at the forward end by selected movement of the valve flaps 72a, 72b, 72c, 72d, 74a, 74b, 74c, and 74d. For example, in the full line position shown in FIG. 3, wherein the two valves direct the air downwardly and rearwardly, the full force of the impeller which is thusly directed downwardly and rearwardly through the air passageways 56, 58 and 60, the flap 68 being in the horizontal position as shown, maximum thrust and lift are obtained but depending upon selected operation of the rear diverter vanes 112 and the trim and rudder assembly 148. By suitable positioning of the various flaps of valve units 72 and 74 any desired combination of lift and thrust can be obtained. Differential action of these flaps on opposite sides of the center line can provide roll control action to stabilize the vessel.

Flaps 68 normally will be maintained in a horizontal position and serve to create a vacuum thereunder. Such position pulls the bow wave down to decrease resistance of the vehicle in the water and also holds the boat down on the water. As shown in broken lines in FIG. 3, this flap can be lowered at times when it is not necessary to develop a rearward vacuum on the bow wave.

Primary steering function of the boat is accomplished by the rudders 182 that depend from the trim flaps 150 and 152 under control of the actuators 192. If it is desired to apply lift to the vehicle, trim flaps 150 and 152 are lowered and manipulated by suitable controls from the cockpit to trim the vehicle. A full down position of the trim flaps is usually desirable when the vehicle has a heavy load since then maximum lift is usually required. With lesser loads, the trim flaps can be raised accordingly.

With the trim flaps in a down position, primary steering will be accomplished by the auxiliary rudders 130. These rudders are pivotal between two extreme positions against the tapered surfaces 138 for deflection through one or both passages. Central wall 134 provides a maximum deflecting surface in these auxiliary rudders.

Diverter vanes 112 can be closed and diverter vanes 114 opened, as shown in full lines in FIG. 1, to direct air and water through the auxiliary rudders 130. If desired, vanes 112 may be swung inwardly, as shown in broken lines in FIG. 1 and vanes 114 opened as shown in full lines. This assists auxiliary rudders 130 in steering. If desired, vanes 114 may be swung inwardly to close off air and water flow to rudders 130 whereby full steering is accomplished by rudders 182. These various functions can be accomplished individually or in combination for best vehicle operation as to thrust, lift and steering.

Braking can also be accomplished by using the valve units 72 and 74, as well as diverter vanes 112. Such reverse is accomplished by rotating the valve units 72 and 74 a sufficient degree such that the undersurface thereof will be exposed to the force of the air from the impeller. Diverter vanes 112 may also be moved to the outward dotted line position shown in FIG. 1 to accomplish a reverse thrust.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An air cushion vehicle comprising:
   an elongated body having a forward bow portion, a stern, and a lower portion with a floor, side walls and a front wall defining a longitudinal, rearwardly opening air channel in the underside thereof;
   a duct in said bow portion having a driven impeller therein;
   a plenum chamber extending from and having an outlet communicating with said air channel rearwardly of said front wall;
   first pivoting valve means in said outlet rearwardly of said frontwall and disposed at approximately the horizontal plane of an upper portion of said front wall,
   said first valve means directing air flow from the plenum chamber selectively downwardly, rearwardly and forwardly;
   second valve means in said outlet mounted at said front wall in horizontal alignment with said first valve means and operative with said first valve means for controlling the flow of air to said air channel,
   said second valve means comprising a paddle type valve having pivoted support at a forward edge thereof and selectively pivotal to control the vacuum thereunder and pulling down a bow wave that may develop under forward movement of the vehicle.

2. The air cushion vehicle of claim 1 wherein said second valve means is pivotally mounted in said outlet on a transverse axis, and actuator means arranged to pivotally adjust the pivoted position of said second valve means to control the force of he vacuum developed thereunder.

3. The air cushion vehicle of claim 1 including hollow side runners on the bottom of the vehicle extending from a forward portion of the vehicle to the stern, each of said runners having an outlet through the stern of he vehicle, a pivotal air and water flow controller mounted closely adjacent each of said outlets of said runners, at least two longitudinal passageways in each of said controllers separated by a dividing wall, at least two valve seats on said outlet arranged for selectively directing air and water from said channel through said passageways, and actuator means providing pivoted adjustment of said controller for selected operation of said controller in the directional flow of air and water through one or both of said passageways.

4. The air cushion vehicle of claim 3 wherein said controller includes a pair of oppositely angled inlet surfaces and said valve seats are correspondingly angled for engagement by respective inlet surfaces.

5. The air cushion vehicle of claim 1 wherein said steering means comprises a trim rudder mounted in the rear portion of said air channel, said trim rudder comprising a pair of trim flaps mounted on a lateral extending pivot, actuator means arranged to selectively position said flaps between raised and lowered positions, and steerable depending rudder means on said trim flaps having upwardly projecting stub shafts journaled in said trim flaps intermediate front and rear edges thereof, said rudders extending from a point adjacent said laterally extending pivot to a rear portion of said trim flaps.

* * * * *